US007842122B2

(12) United States Patent
Golner et al.

(10) Patent No.: US 7,842,122 B2
(45) Date of Patent: Nov. 30, 2010

(54) GAS REMOVER APPARATUS AND METHOD

(75) Inventors: Thomas M. Golner, Pewaukee, WI (US); Peter C. Michel, Muskego, WI (US)

(73) Assignee: Waukesha Electric Systems Incorporated, Waukesha, WI (US)

(*) Notice: Subject to any disclaimer, the term of this patent is extended or adjusted under 35 U.S.C. 154(b) by 1662 days.

(21) Appl. No.: 10/697,950

(22) Filed: Oct. 31, 2003

(65) Prior Publication Data

US 2005/0095177 A1 May 5, 2005

(51) Int. Cl.
*B01D 46/46* (2006.01)
*H01T 4/00* (2006.01)

(52) U.S. Cl. .............................. 95/12; 422/168; 95/15; 361/137

(58) Field of Classification Search ............. 239/533.1; 422/168; 169/66; 95/12, 15; 361/137; 73/863.71, 73/61.42
See application file for complete search history.

(56) References Cited

U.S. PATENT DOCUMENTS

| | | | | |
|---|---|---|---|---|
| 5,619,121 | A * | 4/1997 | Trainor | 323/256 |
| 5,809,976 | A * | 9/1998 | Cook et al. | 123/516 |
| 5,946,171 | A * | 8/1999 | Magnier | 361/37 |
| 6,391,096 | B1 * | 5/2002 | Waters et al. | 96/6 |
| 6,568,287 | B2 * | 5/2003 | Golner et al. | 73/863.71 |
| 6,581,694 | B2 * | 6/2003 | Golner et al. | 169/66 |
| 6,884,998 | B2 * | 4/2005 | Nichols | 250/302 |
| 6,928,861 | B1 * | 8/2005 | Rice | 73/61.42 |
| 7,038,201 | B2 * | 5/2006 | Nichols | 250/302 |

FOREIGN PATENT DOCUMENTS

| | | | |
|---|---|---|---|
| CA | 2 364 277 | | 5/2003 |
| EP | 0 566 776 | | 10/1993 |
| EP | 0 957 496 | * | 11/1999 |
| JP | 8-22922 | * | 1/1996 |

* cited by examiner

*Primary Examiner*—N. Bhat
(74) *Attorney, Agent, or Firm*—Baker & Hostetler LLP

(57) ABSTRACT

A gas remover apparatus suitable for electrical substation high-voltage transformer load tap changers and similar oil-filled equipment removes potentially hazardous and destructive gases from the air-filled volume above the insulating oil bath in which the load tap changer electrical contacts are immersed. The apparatus applies a continuous supply of nitrogen to the load tap changer, and has an orifice to maintain a slight overpressure over an extreme range of climatic conditions. The substantially continuous venting of nitrogen entrains and expels contaminants such as oxygen, water, and potentially explosive breakdown products from the oil, all of which can degrade the performance of the load tap changer.

24 Claims, 4 Drawing Sheets

GAS REMOVER APPARATUS AND METHOD

FIELD OF THE INVENTION

The present invention relates generally to oil-filled switching apparatus for electrical substations and other high-voltage, high-power applications. More particularly, the invention relates to apparatus and methods for maintaining an environment free of excessive pressure and explosive vapors in head space above the oil that fills load tap changers.

BACKGROUND OF THE INVENTION

It is known in the manufacturing of power distribution, apparatus to include, with power transformers, automatically controlled load tap changers that can adjust the voltage at which power is fed to factories, subdivisions, apartment houses, and other large loads, typically several times per day but as often as hundreds of times per day, in response to variations in the applied load. These variations in the applied load change the voltage drops across such substantially fixed resistances as distribution wiring; the changes in the voltage drops in turn demand compensating adjustments in transformer winding connections to minimize errors in the available voltage, with the intent of maintaining at each distributed load as close to a constant voltage as practicable.

Transformer winding switching is performed by devices known to the art as load tap changers, so called because they are engineered to switch from one tap to another on a transformer while carrying kiloamp-level current loads. The contact portion of a load tap changer (LTC) is in some embodiments fully immersed in one of several blends of mineral oil, where the term oil may refer to one of a variety of petroleum distillates which are in the liquid state at room temperature, for insulation, cooling, and reduction of arcing. Numerous petroleum distillates may be suited to particular applications, as determined by operating temperature range, viscosity requirements, water absorption, electrical properties such as dielectric coefficient, conductivity, and change in electrical properties with moisture concentration, temperature, and the like.

The non-oil-filled gas volume at the top of the open chamber in a tap changer, transformer, or other device is termed ullage. The pressure in the ullage in an LTC tends to change slowly with outside temperature, as the oil volume typically can provide a significant thermal reservoir.

Despite the presence of insulating oil, the immersed tap switching events can produce arcing, which tends to break down the oil, leaving contaminating particles as well as liquid and gas hydrocarbon molecules of various molecular weights. A portion of the contaminating particles can be deposited on the sliding contacts of the LTC, building up a resistive layer and increasing contact heating, with the waste heat ultimately coupled to the oil. Removal of these deposits is promoted by abrasion between the sliding contacts during each tap change. Another portion of the contaminating particles can remain in suspension in the oil until mechanically removed by passing the oil through a filter. Still another portion of the contaminating particles may sink to the bottom of the oil volume, while others float to the surface or form foams.

An LTC can be vented rather than being hermetically sealed, so that there is some opportunity in many systems for water vapor and other airborne contaminants to enter the system; the contaminants can be absorbed by the oil, can be entrained as corrosion promoters, and can be shown to directly lower the dielectric constant of the oil. A variety of known technologies can serve for suppression of entrainment of water vapor, such as the use of a desiccant within the ullage of the LTC.

Another phenomenon evident in some LTCs, in the presence of dissolved oxygen and water in mineral oil subjected to arcing events, is formation of organic acids and other reactive chemical compounds, some of which can be destructive of some components of the system.

Accordingly, there is a need in the art for an apparatus and method capable of providing to some extent a continuously refreshed nonreactive gas atmosphere in an LTC and associated subsystems, balancing requirements for fresh supplies of gas against assured minimization of combustibles, oxidizers, and other corrosives in all accessible regions of the LTC, both continuously during operation and at a rapidly restoring rate after servicing, while avoiding to at least some extent the requirement for periodic maintenance and its associated expenses.

SUMMARY OF THE INVENTION

The above needs have been met to at least some degree by a novel nonreactive atmosphere control apparatus and method, as herein described.

In accordance with one embodiment of the present invention, a gas remover system that provides capability for expelling gases from a load tap changer (LTC) comprises a nitrogen generator to extract nitrogen from the atmosphere; a feed line to introduce the nitrogen extracted by the nitrogen generator into an ullage in the LTC; and an orifice to establish an outflow rate of nitrogen along with entrained vapor phase contaminants, if present, from the LTC ullage to the atmosphere.

In accordance with another embodiment of the present invention, a gas remover for expelling gases from an LTC comprises means for extracting nitrogen gas from the atmosphere; means for urging the extracted nitrogen gas into an ullage in an LTC; and means for establishing a substantially continuous outflow of nitrogen from the ullage to the atmosphere along with entrained vapor phase contaminants, if present.

In accordance with yet another embodiment of the present invention, a process for expelling gases from an LTC is comprised of the steps of extracting nitrogen gas from the atmosphere; urging the extracted nitrogen gas into an ullage in an LTC; and establishing a substantially continuous outflow of nitrogen from the ullage to the atmosphere along with entrained vapor phase contaminants, if present.

There have thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
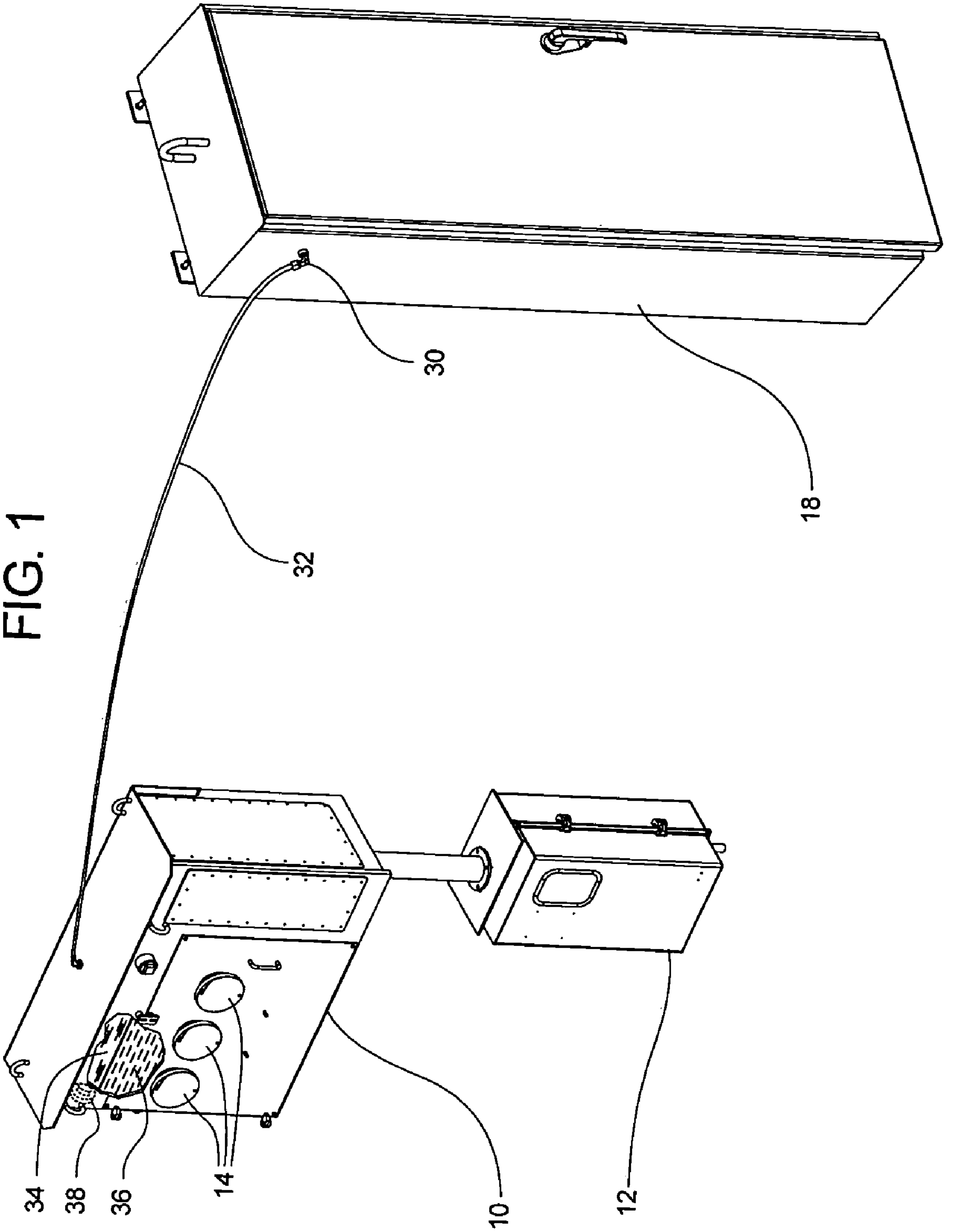
FIG. 1 is a perspective view of a load tap changer configured to include the inventive apparatus.

In a preferred embodiment of the present invention, a nitrogen gas based contaminant gas remover apparatus and method is provided, which allows displacement of gases through a generally continuous bleed of nitrogen introduced from a nitrogen source and released using a vent orifice. The expelled gases may include contaminant, corrosive, explosive, and/or pressurizing gases, for example. With a nonreactive gas overpressure in place, opportunity for the introduction of oxidants from outside the LTC system is minimized, and with a continuous bleed, virtually all water, oxygen, vapor-phase oxidants, combustible vapors, and other contaminants introduced, such as low-mass breakdown products from the oil, can escape into the atmosphere, leaving the LTC largely free of oxidants and other contaminants.

The invention will now be described with particular reference to the drawing figures, in which like reference numerals refer to like parts throughout.

FIG. 1 shows a representative load tap changer (LTC) 10 with an associated motor box 12. Sight glasses 14, one for each phase of the AC power handled by the transformer 12, permit a technician to look inside the LTC 10 to examine the cleanliness of the mineral oil inside and the condition of the taps between which the LTC 10 switches in order to compensate for load current variations.

Figure 2:
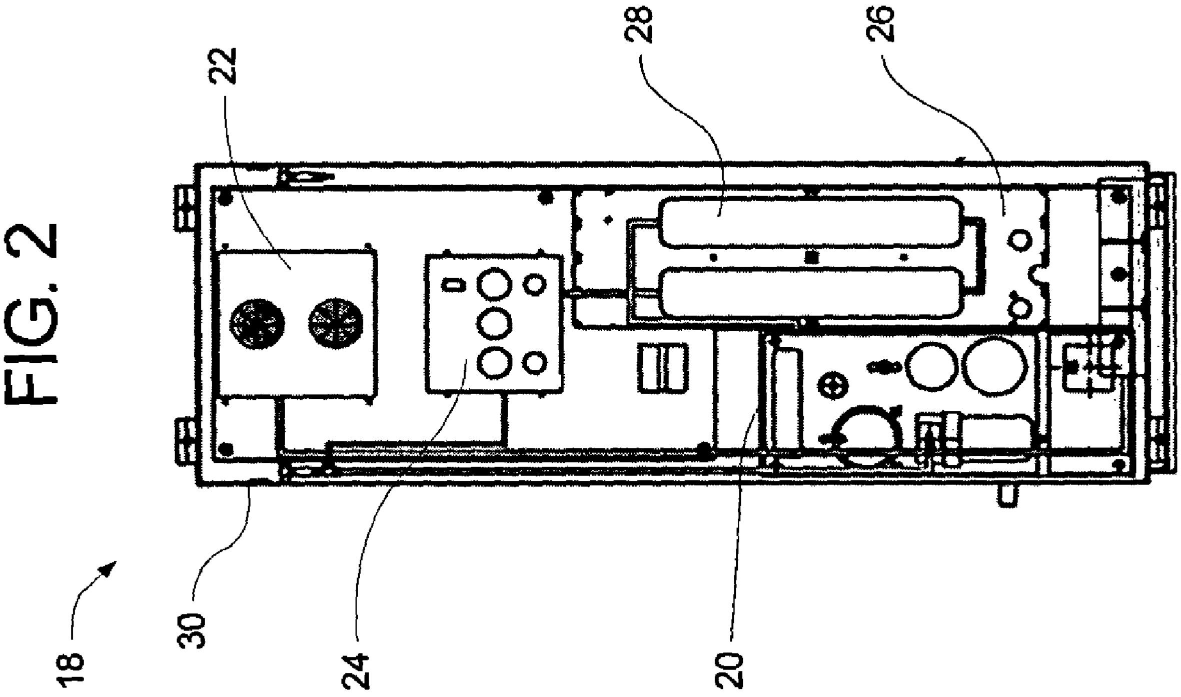
FIG. 2 is a front view without the door of a nitrogen gas generator of the type used to maintain nitrogen gas charge in a transformer and its associated load tap changer and other apparatus.

FIG. 2 shows the interior of a representative nitrogen generator 18 intended to support a power transformer, and including sufficient surplus capacity to support a preferred embodiment of the present invention. An air compressor 20 is shown along with a fan-forced heat exchanger 22 within the nitrogen generator 18; for a preferred embodiment, such an air compressor 20 can be designed to operate intermittently, for example for up to several years with minimal maintenance.

A pressure regulator panel 24 can establish preferred pressures for some or all of the functions of the nitrogen generator 18. The controlled pressures can include the air compressor 20 air pressure output, which can include a failure mode shutdown threshold as well as a regulated level with a feedback control function; control over the air pressure level fed into the filter membrane 26; regulation of the filter membrane 26 nitrogen output pressure, whether by the use of feedback control to the input, by the use of output bleed, or both; nitrogen pressure fed into a makeup nitrogen reservoir bottle or bottles 28; minimum/maximum controlled nitrogen pressure into the ullage 22 of the LTC 10, and a makeup nitrogen output pressure control.

Regulator valves are particularly well suited to the task of pressurizing multiple devices. A multiplicity of regulator valves can, for example, be required with high-power transformers. In high-power transformers, the transformer itself may need a clean and isolated supply, and may not generate significant amounts of contaminants. An associated LTC 10 sharing the same nitrogen generator 18, meanwhile, may produce contaminants on a daily basis, and require continuous purging flow. Using a separate flow regulator for each function can assure satisfactory performance without undue complexity. In some embodiments, multiple flow regulators can use a piping arrangement that is common in part to two or more of the regulators.

A nitrogen source feeding a manifold that has several regulator valves can provide the variety of pressure feeds required by the components of a transformer system. Such a manifold can include a second regulator valve to charge the LTC 10 at a high rate, such as by employing ten times the normal overpressure, in order to purge the LTC 10 after it has been opened or otherwise allowed to receive a large contamination influx, as well as during climate-induced sudden pressure drops.

The exemplary embodiment shown in FIGS. 1 and 2 is representative of several possible embodiments that can permit development of a broad range of system configurations suited to particular applications. A comparatively small number of nitrogen generator system sizes spread over a wide range of output flow rates, for example, can be used to provide the nitrogen needed for a broad range of sizes of transformers and their associated LTCs.

Returning to FIG. 1, a nitrogen feed line 32 from an output port 30 of the nitrogen generator 18 carries low pressure nitrogen to the LTC 10 and applies a nitrogen overpressure to the ullage 34 above the oil volume 36 in the LTC 10. The outflow orifice 38 shown in phantom in FIG. 1 is located inside the LTC 10 within the ullage 34 volume above the oil 36.

Figure 3:
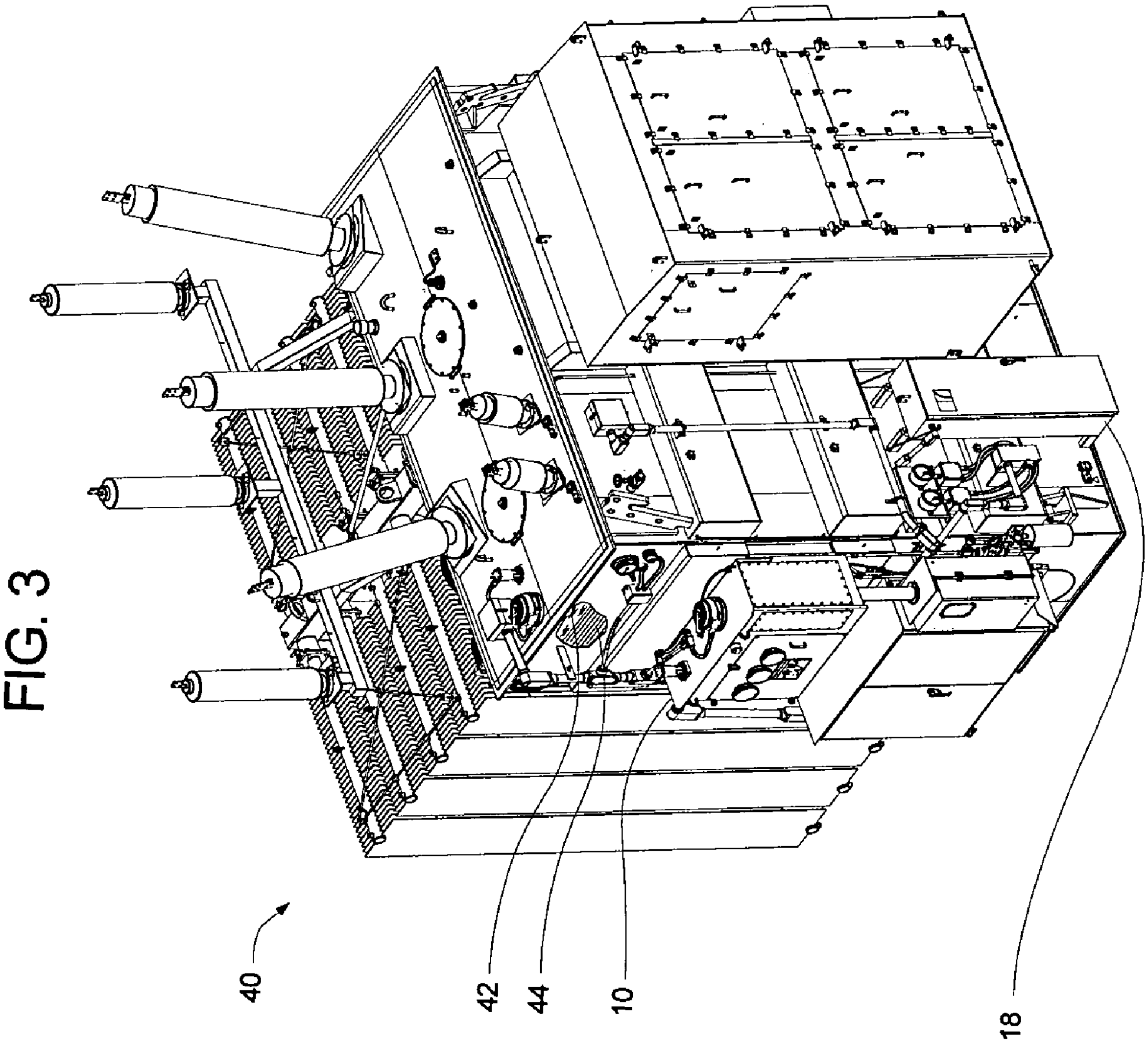
FIG. 3 is a perspective view of a representative transformer that uses a load tap changer and can accept the inventive apparatus.

FIG. 3 shows a representative prior art transformer 40 with an affixed load tap changer 10. Provision of a nitrogen generator 18 to pressurize a power transformer 40 is known in the art to assure maintenance of a nitrogen overpressure in the transformer ullage 42 above the windings of the transformer 40. The oil-filled interior 44 of the transformer 40 represents a stable and substantially inert environment, provided any gas leakage is restored with nitrogen. The size of the transformer 40—comparable in some cases to the size of an over-the-road truck cab—and the criticality of its maintaining a stable amount of nitrogen can dictate the use of a nitrogen generator 18 with enough surplus capacity to support an inert-gas-charged LTC 10 without adding additional equipment other than manifolds and check valves, and without increasing the size and capacity of the nitrogen generator 18.

Figure 4:
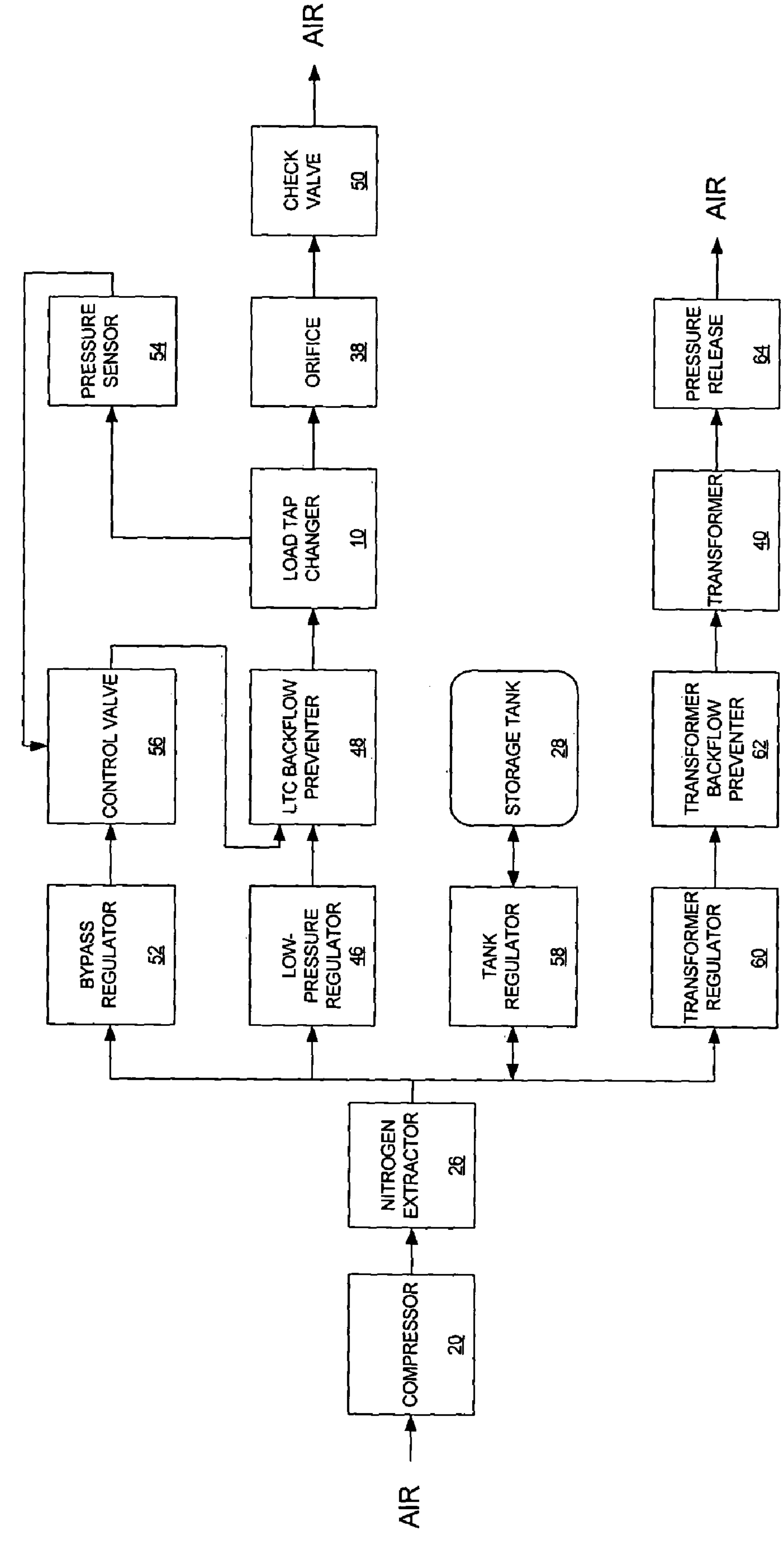
FIG. 4 is a system block diagram showing a transformer, to which are affixed a load tap changer and a nitrogen gas generator.

FIG. 4 shows the exemplary inventive system in block diagram form. Here, the compressor 20 provides high-pressure air to the nitrogen extractor 26, which can furnish nitrogen substantially free of contaminants to a multiplicity of regulators. The primary regulator can be seen as the low-pressure regulator 46, which, through an LTC backflow preventer 48, feeds the ullage 34 within the LTC 10. An orifice 38 establishes a controlled and substantially constant flow rate of nitrogen into the atmosphere by way of an orifice check valve 50. A high-pressure bypass regulator 52 can provide an alternate flow path to reload the LTC 10 when a pressure sensor 54 detects that the pressure has dropped below a critical level, driving a control valve 56 that allows the bypass regulator 52 to flow nitrogen into the ullage 34. An alternative method using a manual control valve on the high-pressure regulator 52 is potentially feasible since the principal need for makeup gas may come from servicing, for which an operator can be available who can activate and deactivate such a manual valve. Nitrogen from the nitrogen extractor 26 can also feed a storage system comprising a tank regulator 58 and one or more storage tanks 28; the stored nitrogen can provide a substantially constant supply, which can be particularly useful to perform the rapid replenishment activity described above. As in a transformer 40 without the inventive apparatus, another regulator, here termed a transformer regulator 60, can establish and regulate the nitrogen charge within the transformer 40, using a transformer backflow preventer 62 to prevent contaminated gases from feeding back into the nitrogen generator system and a pressure release 64 to vent to the atmosphere in event of sudden pressure rises within the transformer 40.

The LTC 10 shown in FIG. 1 includes a preferred embodiment of the inventive apparatus. The tap changing mechanisms inside are fully submerged in oil 24 in normal operation, with the oil 24 normally receiving a low nitrogen overpressure, which can in some embodiments be on the order of one-half PSI, roughly 3% above the external atmosphere. The level of pressure differential established for a particular embodiment can be maintained by the low-pressure regulator 46, a component of the regulator panel 24 dedicated to this function. The orifice 38 establishes a flow rate suitable for the nitrogen generator 18 of the embodiment. A nitrogen flow rate suitable for a representative LTC 10 may be on the order of two standard cubic feet of nitrogen per day.

Changes in solar irradiance, air temperature, rainfall, and other climatic phenomena, as well as electrical loading, power discharge in the course of switching, and other electrical phenomena, may affect the temperature of the LTC 10, in turn producing changes in the enclosed volume of the LTC 10. While the thermal mass of the oil 24 that substantially fills the LTC 10 slows changes to the temperature of the gas comprising the ullage 22, and hence the volume of the gas, nonetheless the fill pressure from the regulator panel and the pressure reduction through the orifice 26 may not be sufficiently in equilibrium at any given moment to maintain a desirable level of overpressure.

In the case of underpressure within the LTC 10, a second flow path for fill nitrogen may be desirable to shorten the time during which higher outside pressure may force atmospheric gases to enter the ullage 22 through the orifice 26. This need can also occur after maintenance, when the LTC 10 can have been opened to the atmosphere, in which case water vapor and oxygen can have been introduced while lowering internal pressure within the LTC 10 to atmospheric pressure. A check valve in the orifice 26 vent to the outside atmosphere may help to minimize the effects of this phenomenon by stopping flow in both directions when the overpressure inside the LTC 10 is near zero. A fast feed system that bypasses the low-pressure regulator, or another similar arrangement, may be employed to accelerate pressure restoration.

Under some weather conditions, a tendency for contaminants to be urged from the atmosphere into the LTC 10 may be made more severe, for example, by condensed water vapor inside the vent path of a chilled LTC 10. Such water condensate may form an appreciable and potentially destructive quantity of liquid. Heavy rain, rain driven by strong winds, site flooding, or another climatic phenomenon may represent a source of abundant water that can under some circumstances represent a similar risk to the system. Entry of liquid water into the LTC 10 may be in part resisted by the fitting of an orifice check valve in the form of a float valve into the vent line. A ball with good sphericity may be induced to seal against a seat when floated against the seat by any fluid of higher specific gravity than the ball itself. Other styles of floating devices, such as flappers, may similarly provide a seal against fluids that can lift them.

In the case of overpressure inside the LTC 10, the orifice 26 may continue to vent to the atmosphere, while flow from the nitrogen generator 18 may essentially stop until the pressure within the LTC 10 returns to its preferred overpressure level. A check valve or comparable backflow preventer 48 in the gas feed line from the nitrogen generator 18 to the LTC 10 may serve to substantially prevent higher pressure within the LTC 10 from forcing contaminated fill nitrogen into the low pressure portions of the regulator itself prior to the restoration of the preferred overpressure level through continued venting via the orifice 26.

System faults may occur due to unforeseeable weather extremes, breakdowns of other equipment at a site, premature wearout, and other incidents. Since the nitrogen generator 18 may have logic controls or detectors with logic resources, it can be feasible to connect communication apparatus to the nitrogen generator 18 that can transmit reports of performance degradation before gross failures occur, allowing, for example, focused response by limited numbers of repair crews during major storms. Periodic transmission of system status can provide degradation histories at multiple sites, further enhancing maintenance performance.

Reference has been made throughout to nitrogen as a nonreactive gas that can be exceptionally suitable as a fill agent. While the suitability of nitrogen is true for most applications, the attribute of nonreactivity is not unique to nitrogen, and alternate fill gases may be well suited to the task, although alternative fill gases may not as often be readily available. For example, helium has properties that may make it preferable to nitrogen in some regimes, as do the other noble gases, any of which may normally be vented to the atmosphere without harm, as well as some compounds. Helium, moreover, may be available with negligible cost as a petroleum byproduct at an oil refinery. In systems in which a fill gas other than nitrogen is readily available, which gas exhibits comparable or superior properties, that other gas can be used in place of nitrogen by accommodating differences in required pressure, thermal, diffusion, and flow properties, and the like.

The use of a nitrogen generator 18 as a nitrogen source has been presented herein as an example of the preferred embodiment. Other embodiments may use other sources, such as liquid nitrogen Dewar storage vessels, sufficient numbers of high-pressure gas storage tanks, or other suitable sources.

The many features and advantages of the invention are apparent from the detailed specification; thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to that fall within the scope of the invention.

What is claimed is:

1. A gas remover to control an environment in a load tap changer, the gas remover comprising:

a source of substantially nonreactive gas at a pressure greater than ambient atmospheric pressure;

a feed line configured to introduce the nonreactive gas into an ullage in the load tap changer;

a sight glass on the load tap changer to permit examination of the inside of the load tap changer, wherein the load tap changer contains mineral oil; and an orifice configured to establish a substantially continuous outflow rate of nonreactive gas to expel entrained vapor phase contaminants from the ullage in the load tap changer to the atmosphere.

2. The gas remover of claim 1, wherein the gas remover further comprises a nitrogen generator configured to extract nitrogen from the atmosphere for use as the substantially nonreactive gas.

3. The gas remover of claim 2, wherein the gas remover further comprises an inlet air filtration system to filter air entering said nitrogen generator.

4. The gas remover of claim 2, wherein the gas remover further comprises an air compressor to furnish compressed air to said nitrogen generator.

5. The gas remover of claim 2, wherein the gas remover further comprises a gas separating membrane within said nitrogen generator, wherein said separating membrane is capable of removing gases including at least one of ozone, carbon compounds, sulfur dioxide, and hydrogen sulfide from the outflow stream from said nitrogen generator to limit each contaminant to a maximum of 1 part per million of the mass of the outflow gas.

6. The gas remover of claim 2, wherein the gas remover further comprises a gas separating membrane within said nitrogen generator, wherein said separating membrane is capable of removing gases including at least one of oxygen and water vapor from the outflow stream from said nitrogen generator to limit each contaminant to a levels specified by the American Society of Testing and Materials (ASTM) for Type I insulating gas.

7. The gas remover of claim 2, wherein the gas remover further comprises a storage reservoir within said nitrogen generator configured to store nitrogen during an operational period for said nitrogen generator.

8. The gas remover of claim 2, wherein the gas remover further comprises a pressure regulator in the feed line from said nitrogen generator to the load tap changer ullage to lower the nitrogen pressure from a first pressure level at which the nitrogen is generated and stored to a second pressure level at which it is introduced into the load tap changer ullage.

9. The gas remover of claim 2, wherein the gas remover further comprises an alternative pressure regulation facility in the feed line from said nitrogen generator to the load tap changer ullage, which alternative pressure regulation facility provides an increased flow rate from the nitrogen section to the load tap changer ullage during a venting cycle.

10. The gas remover of claim 2, wherein the gas remover further comprises an alternative pressure regulation facility in the feed line from said nitrogen generator to the load tap changer ullage, which alternative pressure regulation facility provides an increased flow rate from the load tap changer ullage to the atmosphere during a venting cycle.

11. The gas remover of claim 1, wherein the gas remover further comprises a gas flow path that establishes an effective output venting rate from the load tap changer ullage to a standard atmosphere.

12. The gas remover of claim 1, wherein the venting rate is dependent on total gas pressure within the ullage.

13. The gas remover of claim 1, wherein the gas remover further comprises a gas flow path establishing an output venting rate from the load tap changer ullage to the atmosphere surrounding the load tap changer of approximately 2 cubic feet of nitrogen per day.

14. The gas remover of claim 1, wherein the gas remover further comprises a control mechanism to permit manual selection of said alternative pressure regulation facility.

15. The gas remover of claim 1, wherein the gas remover further comprises an automatic control mechanism to permit pressure-regulated engagement of said alternative pressure regulation facility.

16. The gas remover of claim 1, wherein the gas remover further comprises a check valve between said orifice and the atmosphere.

17. The gas remover of claim 1, wherein the gas remover further comprises a fill gas other than nitrogen.

18. A gas remover to control an environment in a load tap changer, comprising:

means for extracting nitrogen gas from the atmosphere;

means for urging said extracted nitrogen gas into an ullage in the load tap changer;

means for monitoring the condition inside the load tap changer, wherein the load tap changer contains mineral oil; and means for expelling vapor phase contaminants from the ullage in the load tap changer by establishing a substantially continuous outflow of nitrogen.

19. The gas remover of claim 18, further comprising:

means for filtering atmospheric air introduced into said nitrogen generator; and means for compressing atmospheric air introduced into said nitrogen generator to a pressure level sufficient to extract nitrogen therefrom.

20. The gas remover of claim 18, further comprising means for separating gaseous nitrogen from the compressed atmospheric air introduced into said nitrogen generator.

21. The gas remover of claim 18, further comprising:

means for applying power to said compressing means;

means for controlling application of power to said compressing means; and means for establishing pressure thresholds at which power directed to said compressing means may be applied and removed.

22. A process for controlling an environment in a load tap changer, comprising the steps of:

extracting nitrogen gas from the atmosphere;

urging the extracted nitrogen gas into an ullage in the load tap changer;

monitoring the condition inside the load tap changer, wherein the load tap changer contains mineral oil; and expelling vapor phase contaminants from the ullage in the load tap changer by establishing a substantially continuous outflow of nitrogen.

23. The gas removal process of claim 22, further comprising the steps of:

filtering atmospheric air in advance of extracting nitrogen therefrom; and compressing atmospheric air to a pressure level sufficient to extract nitrogen therefrom.

24. The gas removal process of claim 22, further comprising the step of separating gaseous nitrogen from the compressed atmospheric air.

* * * * *